US012146459B2

(12) United States Patent
Singh et al.

(10) Patent No.: US 12,146,459 B2
(45) Date of Patent: Nov. 19, 2024

(54) SYSTEM AND METHOD FOR CLEANING A GRILLE OF A WORK VEHICLE

(71) Applicant: CNH Industrial America LLC, New Holland, PA (US)

(72) Inventors: Samrendra Singh, Bolingbrook, IL (US); Kaushal Ghorpade, Chicago, IL (US); Luca Levato, Modena (IT); Hesam Abbassi, Birmingham, MI (US); Panos Tamamidis, Mount Prospect, IL (US)

(73) Assignee: CNH Industrial America LLC, New Holland, PA (US)

( * ) Notice: Subject to any disclaimer, the term of this patent is extended or adjusted under 35 U.S.C. 154(b) by 672 days.

(21) Appl. No.: 16/782,822

(22) Filed: Feb. 5, 2020

(65) Prior Publication Data

US 2021/0239077 A1 Aug. 5, 2021

(51) Int. Cl.

| | |
|---|---|
| ***B08B 5/02*** | (2006.01) |
| ***B08B 3/02*** | (2006.01) |
| ***F01P 11/06*** | (2006.01) |
| ***F02M 35/08*** | (2006.01) |

(52) U.S. Cl.

CPC ............. *F02M 35/086* (2013.01); *B08B 3/02* (2013.01); *B08B 5/02* (2013.01); *F01P 11/06* (2013.01); *B08B 2203/0205* (2013.01); *F01P 2011/063* (2013.01)

(58) Field of Classification Search

CPC . F02M 35/086; F01P 2011/063; B01D 46/70; B01D 46/71

See application file for complete search history.

(56) References Cited

U.S. PATENT DOCUMENTS

| | | | | | |
|---|---|---|---|---|---|
| 3,155,473 | A * | 11/1964 | McNeil | B60K 11/04 | 55/294 |
| 3,344,854 | A | 10/1967 | Boyajian | | |
| 3,972,700 | A | 8/1976 | Gleockler et al. | | |
| 4,047,912 | A | 9/1977 | Markland | | |
| 4,299,603 | A | 11/1981 | Friesen | | |
| 4,439,218 | A | 3/1984 | Priepke et al. | | |
| 4,874,411 | A | 10/1989 | Snauwaert et al. | | |
| 6,126,079 | A * | 10/2000 | Shoemaker | F01P 7/048 | 236/35 |

(Continued)

FOREIGN PATENT DOCUMENTS

| | | | |
|---|---|---|---|
| DE | 10103139 | 7/2002 | |
| DE | 102010009992 A1 * | 9/2011 | F01P 11/12 |

OTHER PUBLICATIONS

DE102010009992—Machine Translation (Year: 2011).*

*Primary Examiner* — Marc Lorenzi

(74) *Attorney, Agent, or Firm* — Rickard K. DeMille; Rebecca L. Henkel; Peter K. Zacharias

(57) ABSTRACT

A system for cleaning a grille of a work vehicle may include a grille defining an inner side facing towards an interior portion of a work vehicle and an outer side facing towards an exterior of the work vehicle. The system may further include a plurality of nozzles fixed relative to the grille and being directed towards the inner side of the grille. Additionally, the system may include a pressurized fluid source configured to supply pressurized fluid to the plurality of nozzles. The pressurized fluid received by the plurality of nozzles is expelled from the plurality of nozzles and directed through the grille.

9 Claims, 5 Drawing Sheets

(56) References Cited

U.S. PATENT DOCUMENTS

| | | | | |
|---|---|---|---|---|
| 6,192,901 | B1 | 2/2001 | Rome et al. | |
| 6,217,638 | B1 | 4/2001 | Van De Velde | |
| 7,418,997 | B2 | 9/2008 | Martin et al. | |
| 7,998,245 | B2 | 8/2011 | Demonie et al. | |
| 8,276,650 | B2 | 10/2012 | Martin et al. | |
| 8,382,870 | B2 | 2/2013 | Troxell et al. | |
| 8,404,021 | B2 | 3/2013 | Gillingham et al. | |
| 8,641,792 | B2 | 2/2014 | Vladaj et al. | |
| 8,967,307 | B2 | 3/2015 | Kim | |
| 9,309,841 | B2 | 4/2016 | Troxell et al. | |
| 9,718,018 | B2 | 8/2017 | Haynam et al. | |
| 9,989,323 | B2 | 6/2018 | Gauthier | |
| 2004/0003578 | A1* | 1/2004 | Twiefel | B01D 46/681<br>55/385.3 |
| 2008/0010774 | A1 | 1/2008 | Erwin et al. | |
| 2014/0117701 | A1 | 5/2014 | Davis et al. | |
| 2018/0274500 | A1* | 9/2018 | Underhill | B01D 46/70 |

* cited by examiner

SYSTEM AND METHOD FOR CLEANING A GRILLE OF A WORK VEHICLE

FIELD OF THE INVENTION

The present disclosure relates generally to work vehicles and, more particularly, to a system and method for cleaning a grille of a work vehicle.

BACKGROUND OF THE INVENTION

Work vehicles, such as tractors, generally include a cooling system for cooling fluids within the vehicle. The cooling system is configured generate an airflow through a grille (e.g., a front grille of the vehicle) for delivery to or through a downstream component, such as a heat exchanger, before being exhausted from the work vehicle. However, as is generally understood, work vehicles often operate in fields and other harvesting environments in which the ambient air contains large amounts of dust, plant material and other debris. As a result, a vehicle's grille can often become blocked or clogged with debris, thereby preventing air from flowing through the grille and impairing the operation of the cooling system.

Typically, the debris must be removed from the grille manually by an operator, which can be time consuming. Further, in conventional vehicles, there is no way to automatically determine whether the grille is plugged. As such, the work vehicle may be operated for a significant period of time while the grille is plugged, which may cause the various systems of the work vehicle to operate at less than ideal conditions.

Accordingly, an improved system and method for cleaning a grille of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for cleaning a grille of a work vehicle. The system includes a grille defining an inner side facing towards an interior portion of a work vehicle and an outer side facing towards an exterior of the work vehicle. The system further includes a plurality of nozzles fixed relative to the grille and being directed towards the inner side of the grille. Additionally, the system includes a pressurized fluid source configured to supply pressurized fluid to the plurality of nozzles. The pressurized fluid received by the plurality of nozzles is expelled from the plurality of nozzles and directed through the grille.

In another aspect, the present subject matter is directed to a work vehicle, having a hood enclosure extending between a forward end and an aft end, and a grille disposed at the forward end of the hood enclosure. The grille has an inner side facing towards an interior of the hood enclosure and an outer side opposite the inner side. The work vehicle further includes a heat exchanger positioned aft of the grille within the hood enclosure and a plurality of nozzles positioned within the hood enclosure between the grille and the heat exchanger. The plurality of nozzles is directed towards the inner side of the grille and is fixed relative to the grille. Additionally, the work vehicle includes a pressurized fluid source coupled to the plurality of nozzles, where the pressurized fluid source is configured to supply pressurized fluid to the plurality of nozzles.

Additionally, the present subject matter is directed to a method for cleaning a grille through which an airflow is directed for subsequent delivery to a heat exchanger of a work vehicle. The method includes receiving an input associated with cleaning the grille. Further, the method includes supplying pressurized fluid from a pressurized fluid source to a plurality of nozzles configured to direct the pressurized fluid towards the grille and being fixed relative to the grille. Additionally, the method includes expelling the pressurized fluid from the plurality of nozzles through the grille to remove debris from the grille.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
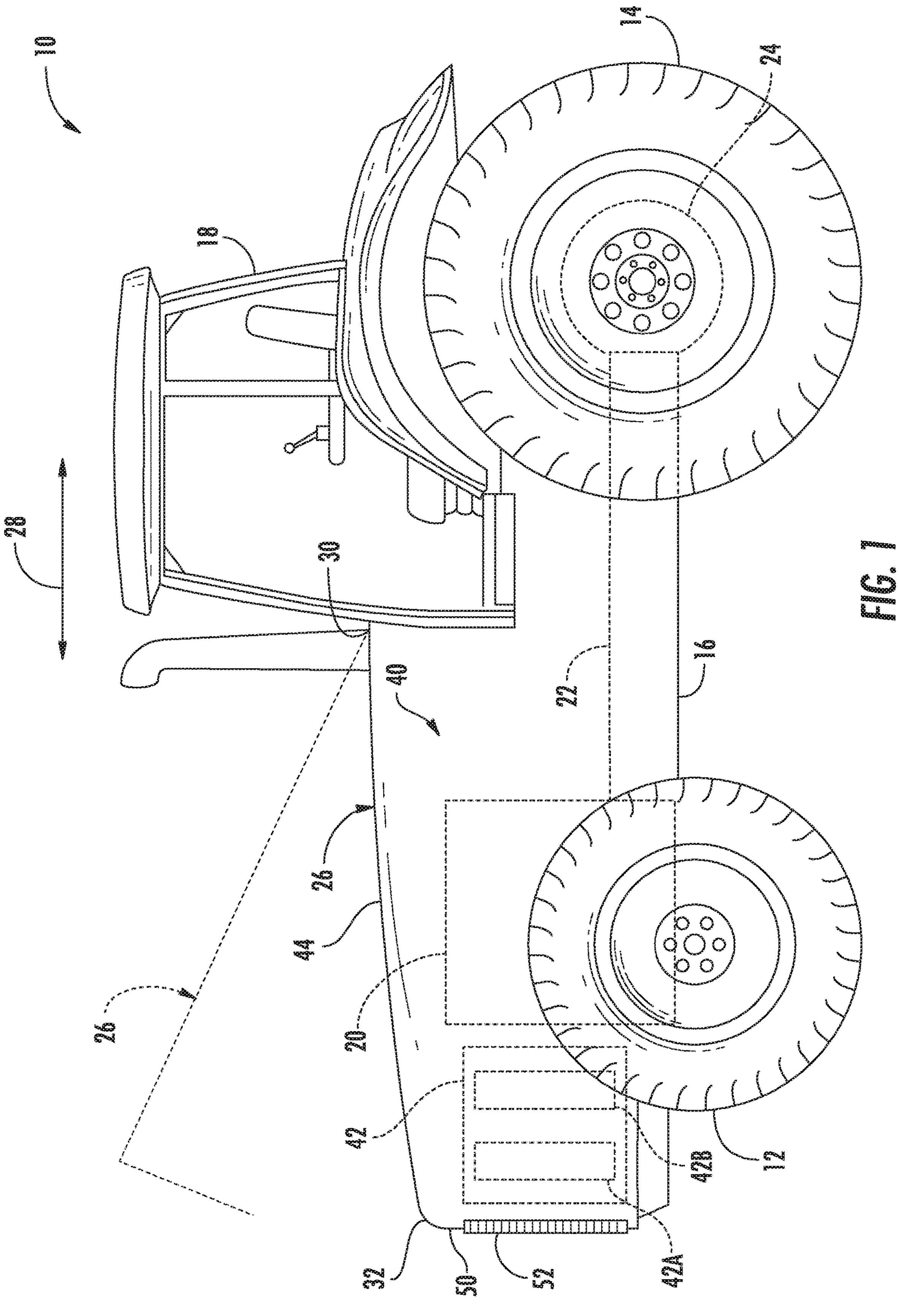
FIG. 1 illustrates a illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for cleaning a grille of a work vehicle. In several embodiments, the grille is positioned upstream of a heat exchanger(s) of the work vehicle and is configured to prevent large debris from entering and clogging the heat exchanger. The grill may become plugged with such debris, which may affect the performance of the heat exchanger(s). As such, systems and methods are provided herein for cleaning such grilles. In accordance with aspects of the present subject matter, the disclosed system may include a plurality of nozzles positioned relative to a grille of a work vehicle to direct pressurized fluid through the grille, thereby allowing any accumulated debris to be removed from the grille.

In one embodiment, pressurized fluid may be supplied to the nozzles by controlling the operation of a valve fluidly coupled between the nozzles and a pressurized fluid source, and/or by operating a compressor to supply pressurized fluid to the nozzles. In one embodiment, the operation of the valve and/or the compressor is controlled based at least in part on a received input indicative of debris accumulation on the grille. Such input may be received, for example, from a pressure sensor positioned between the grille and the heat exchanger. As the pressure increases, the likelihood of debris accumulation on the grille also increases. As such, the supply of pressurized fluid to the nozzles may be initiated when the detected pressure exceeds a predetermined pressure threshold. Additionally, or alternatively, the input may be received from an operator of the work vehicle or from an electronic cleaning module configured to control the system to supply the pressurized fluid on a periodic basis (e.g., depending on operating conditions of the work vehicle).

Figure 2:
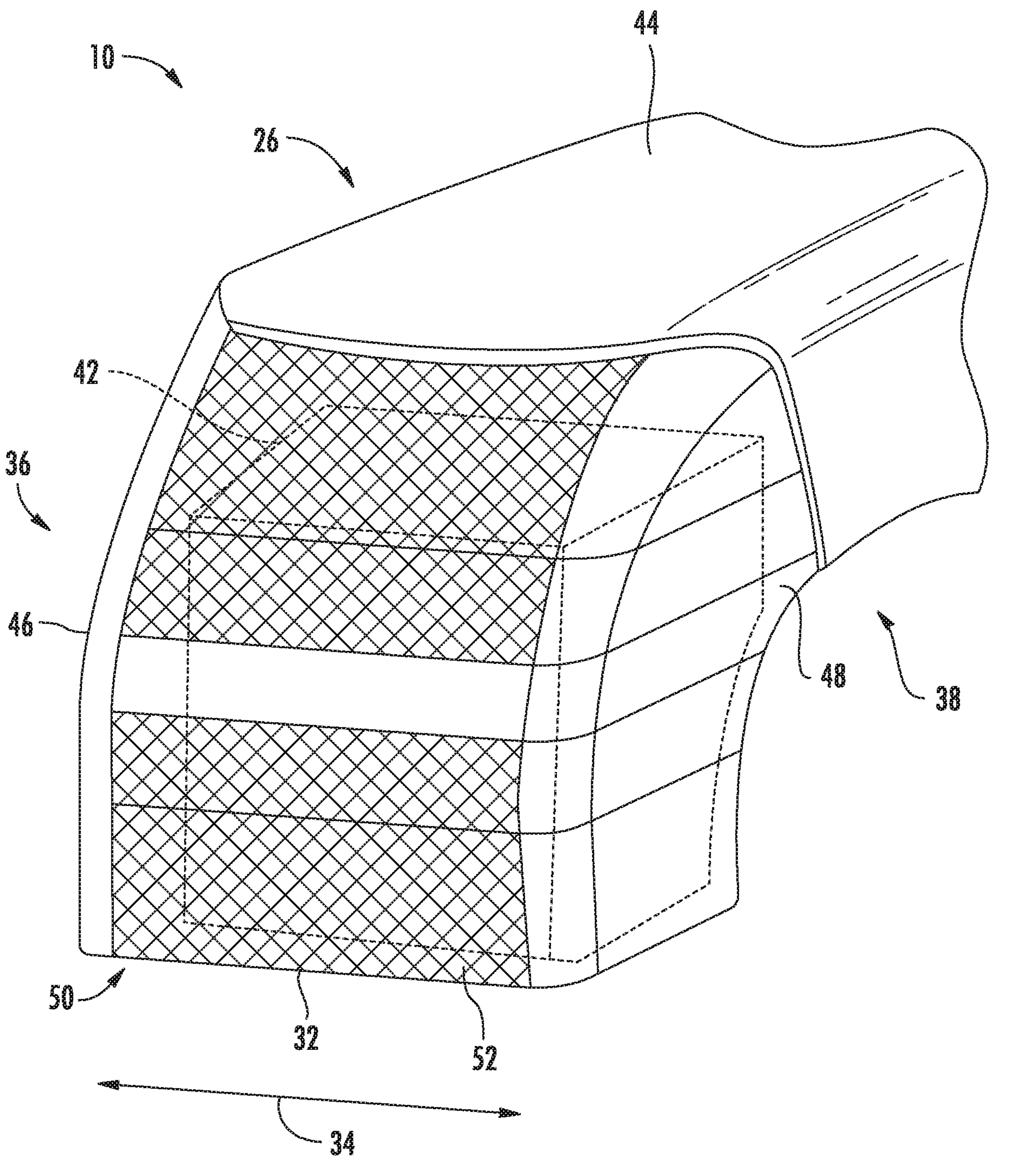
FIG. 2 illustrates a partial, perspective view of a front portion of the hood of the work vehicle shown in FIG. 1, particularly illustrating a grille and cooling system in accordance with aspects of the present subject matter.

Referring now to the drawings, FIGS. 1 and 2 illustrate one embodiment of a work vehicle 10 in accordance with aspects of the present subject matter. In particular, FIG. 1 illustrates a side view of the work vehicle 10 and FIG. 2 illustrates a partial, perspective view of a front portion of a hood 26 of the work vehicle 10 shown in FIG. 1. It should be appreciated that, although the work vehicle 10 illustrated herein is configured as an agricultural tractor, the work vehicle 10 may generally be configured as any suitable work vehicle known in the art, such as various other agricultural vehicles, earth-moving vehicles, road vehicles, loaders and/or the like.

As shown in FIG. 1, the work vehicle 10 includes a pair of front wheels 12, a pair or rear wheels 14, and a chassis 16 coupled to and supported by the wheels 12, 14. An operator's cab 18 may be supported by a portion of the chassis 16 and may house various control devices (not shown) for permitting an operator to control the operation of the work vehicle 10. Additionally, the work vehicle 10 may include an engine 20 and a transmission 22 mounted on the chassis 16. The transmission 22 may be operably coupled to the engine 20 and may provide variably adjusted gear ratios for transferring engine power to the wheels 12, 14 via a differential 24.

The work vehicle 10 may also include a hood 26 configured to extend in a lengthwise direction of the work vehicle 10 (as indicated by arrow 28 in FIG. 1) between an aft end 30 disposed adjacent to the cab 18 and a forward end 32 terminating at the front of the work vehicle 10. Additionally, the hood 26 may be configured to extend in a lateral direction of the work vehicle 10 (as indicated by arrow 34 in FIG. 2) between a first side 38 and a second side 38. As is generally understood, the hood 26 may be configured to least partially surround and/or cover the various under-hood components stored within the vehicle's engine compartment 40, such as the engine 20 and any other suitable under-hood components (e.g., hydraulic components, pneumatic components, electrical components, mechanical component(s), storage tank(s), etc.). For instance, in addition to the engine 20, a cooling system or module 42 of the work vehicle 10 may be positioned within the engine compartment 40, such as at a location in front of the engine 20.

The cooling system 42 may generally include one or more heat exchangers 42A and one or more fans 42B. The heat exchanger(s) 42A may be positioned behind the front end 32 of the hood 26 and be configured to cool engine fluid(s) and/or the other fluid(s) utilized during operation of the work vehicle 10. For instance, the heat exchanger(s) 42A may transmit such fluid(s) through a plurality of tubes having suitable heat transfer features (e.g., cooling fins, rods, coils and/or the like) so that heat is transferred from the fluid(s) to an airflow passing over and across the tubes. For example, in several embodiments, the heat exchanger(s) 42A may comprise one or more radiators, intercoolers, fuel coolers, transmission fluid coolers, engine oil coolers and/or the like. The fan 42B may be configured to draw cooling air into the engine compartment 40 and across and/or through the heat exchanger 42A to cool the fluids flowed through the heat exchanger 42A.

As particularly shown in FIG. 1, the hood 26 may be configured to be pivotally coupled to a portion of the work vehicle 10 at or adjacent to its aft end 30 such that the hood 26 can be pivoted about the aft end 30 between a closed position (shown in solid lines in FIG. 1) and an opened position (shown in dashed lines in FIG. 1). Specifically, by pivoting the hood 26 upwardly such that the front end 32 of the hood 26 is moved away from the engine compartment 40, the hood 26 may be moved from its closed position to the opened position to provide access to the engine compartment 40. Similarly, by pivoting the hood 26 downwardly such that the front end 32 of the hood 26 is moved towards the engine compartment 40, the hood 26 may be moved from its opened position to the closed position to allow the hood 26 to cover the engine compartment 40.

Further, as particularly shown in FIG. 2, the hood 26 may generally include a top wall 44, a first sidewall 46 extending along its first side 36 between the forward and aft ends 32, 30 and a second sidewall 48 extending along its second side 38 between the forward and aft ends 32, 30. Moreover, the hood 26 may also include a front wall 50 disposed at its forward end 32. As is generally understood, the front wall 50 may include a grille 52 (hereafter referred to as "grille 52") to allow an airflow to enter the engine compartment 40 and pass through the cooling system 42. However, the grille 52 may be positioned at any other suitable location on the hood 26, such as on a sidewall 46, 48 or the top wall 44, and/or at any other suitable location on the work vehicle 10. The grille 52 may be configured to prevent large debris in the airflow flowing therethrough from entering the engine compartment 40. As will be described in greater detail below, debris may build up on the grille 52 such that the grille 52 may become increasingly plugged or clogged which may reduce the airflow flowing through the grille 52 and, in turn, the efficiency of the cooling system 42.

Figure 3:
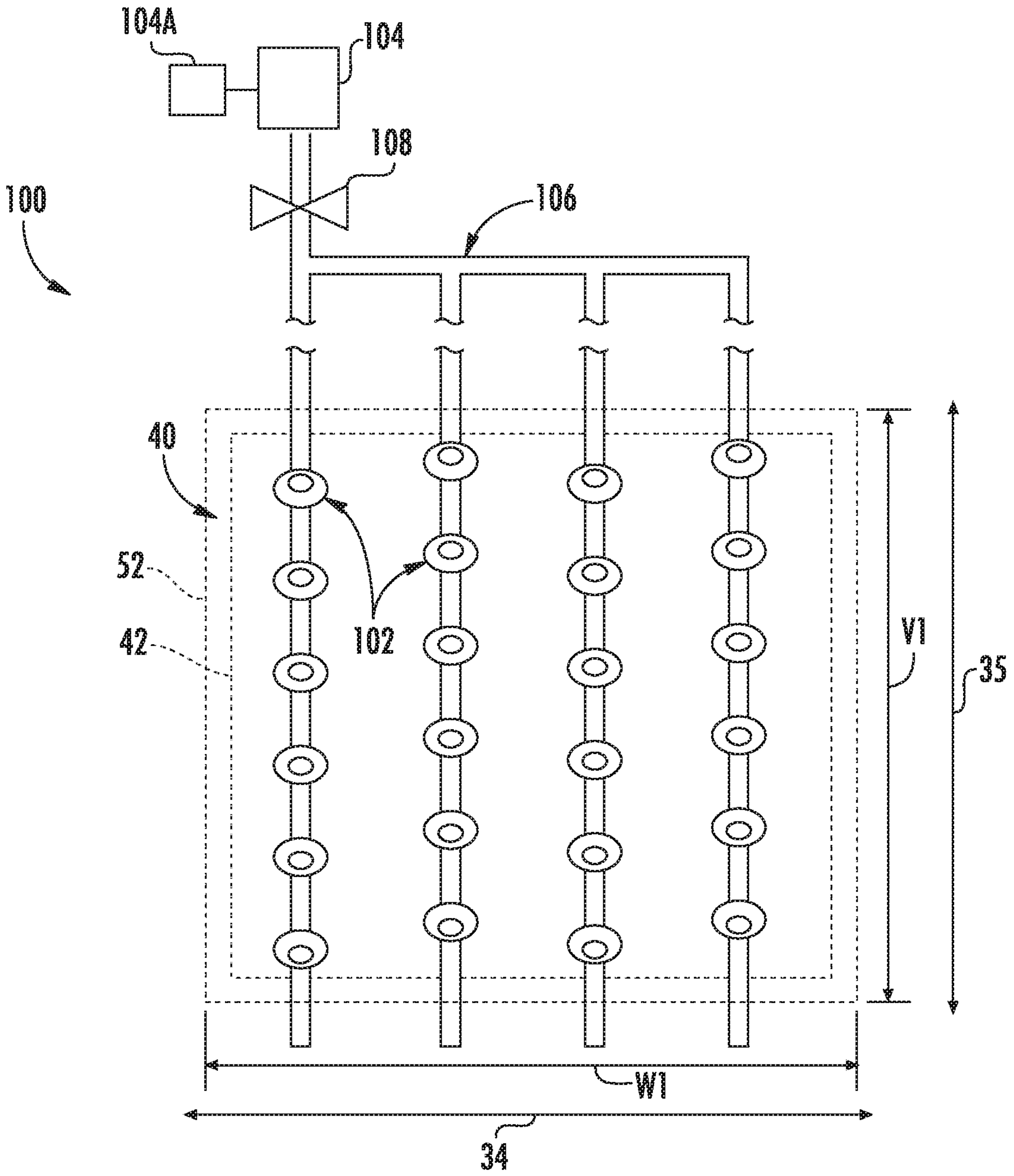
FIG. 3 illustrates a front view of one embodiment of a cleaning system in accordance with aspects of the present subject matter, particularly illustrating the cleaning system positioned relative to the grille and the cooling system shown in FIG. 2.
Figure 4A:
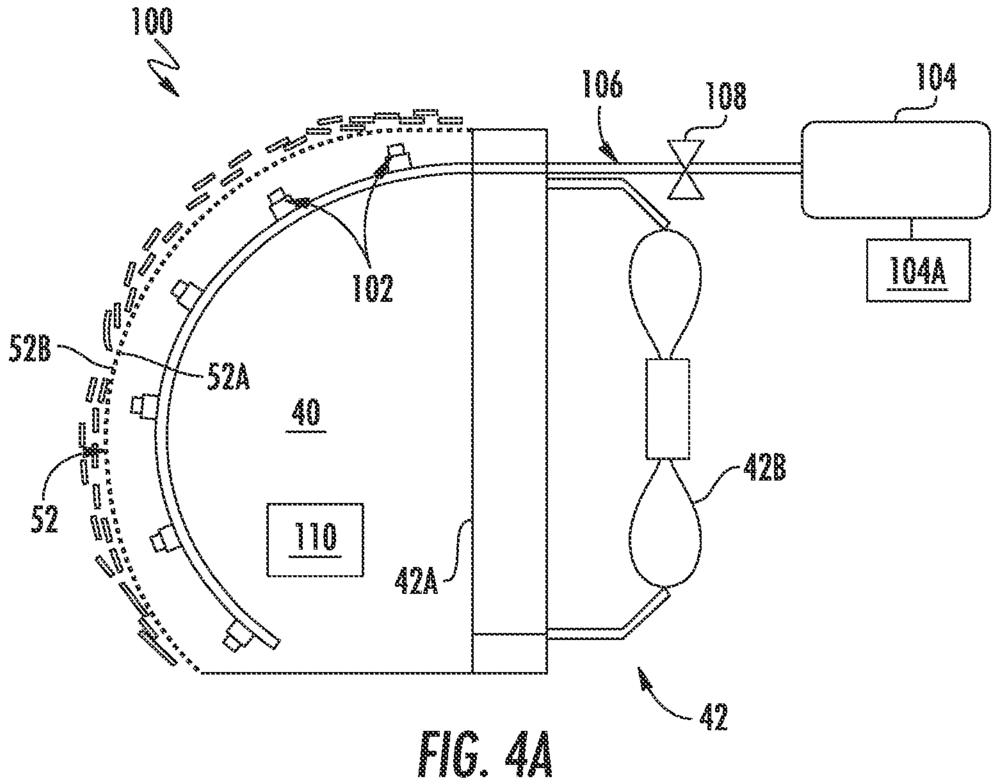
FIG. 4A illustrates a side view of the cleaning system and the cooling system shown in FIG. 3 in accordance with aspects of the present subject matter, particularly illustrating a plugged condition of the grille.
Figure 4B:
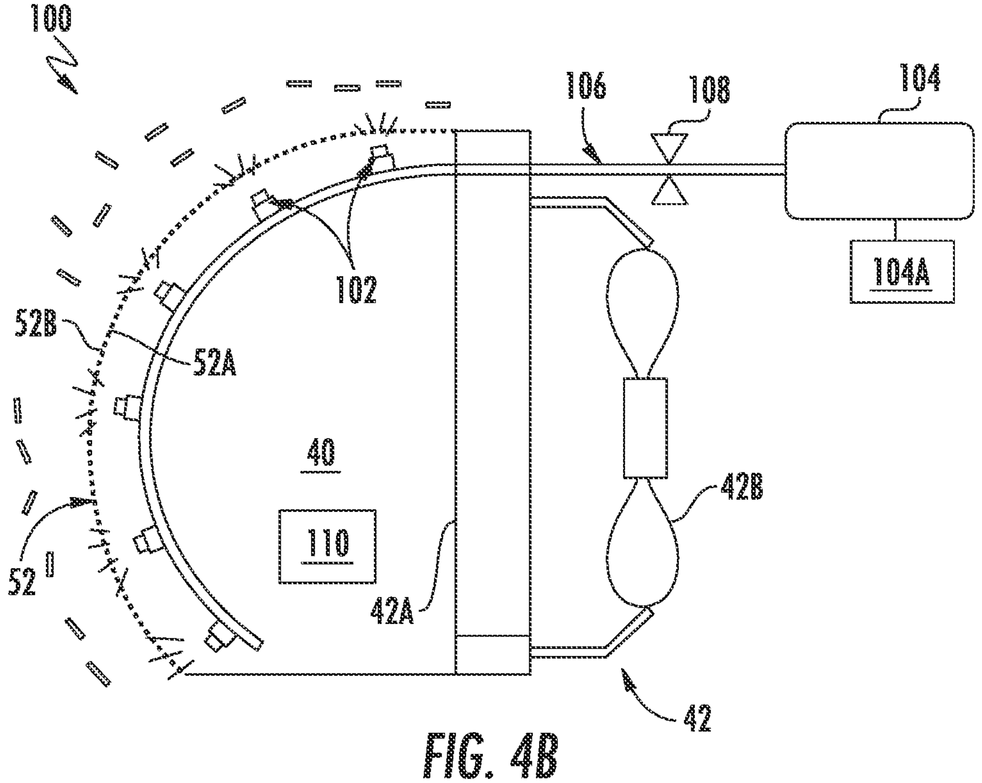
FIG. 4B illustrates another side view of the cleaning system and the cooling system shown in FIG. 3 in accordance with aspects of the present subject matter, particularly illustrating the cleaning system being used to clean the grille.

Referring now to FIGS. 3-4B, several views of one embodiment of a system 100 for cleaning a grille of a work vehicle 10 is illustrated in accordance with aspects of the present subject matter. Specifically, FIG. 3 illustrates a front view of the system 100 positioned relative to the grille 52 and cooling system 42 described above, with only an outline of the grille 52 being shown with dashed lines. Additionally, FIGS. 4A and 4B illustrate section views of the system 100 and the cooling system 42 shown in FIG. 3, particularly illustrating different plugging conditions of the grille 52.

In general, the system 100 may be configured to supply a pressurized fluid through the grille 52 to dislodge or remove accumulated debris on the grille 52. In several embodiments, he system 100 includes a plurality of nozzles 102, a pressurized fluid source 104 configured to supply pressurized fluid to the nozzles 102, and a conduit 106 fluidly coupled between the nozzles 102 and the pressurized fluid source 104.

In several embodiments, the nozzles 102 are configured to be positioned within the engine compartment 40 behind the grille 52 and in front of the cooling system 42 such that each nozzle 102 is directed towards the grille 52. As is particularly shown in FIGS. 4A and 4B, the grille 52 has an inner side 52A and an outer side 52B opposite the inner side 52A, where the inner side 52A being positioned within and/or facing towards the engine compartment 40. In such an embodiment, the nozzles 102 are directed towards the inner side 52A of the grille. As such, the nozzles 102 are configured to receive pressurized fluid from the pressurized fluid source 104 and expel the pressurized fluid through the grille 52 from the inner side 52A towards the outer side 52B. As shown in FIG. 3, the nozzles 102 may be spaced apart along a lateral width W1 of the grille 52 (e.g., parallel to the lateral direction 34) and/or a vertical height VI of the grille 52 (e.g., parallel to a vertical direction as indicated by arrow 35 in FIG. 3) behind the grille 52 such that the pressurized fluid may flow through any portion of the grille 52.

It should be appreciated that the nozzles 102 are sized such that the airflow into the cooling system 42 via the grille 52 is not significantly affected. Thus, the nozzles 102 may be fixed relative to the grille 52 without requiring the nozzles to be completely removed from behind the grille 52 when not in use. Such fixing of the nozzles 102 reduces the complexity and costs of the system, as potentially expensive actuators, tracks, and/or the like are not required, and/or component failures are less likely which reduces service requirements. Further, by using such fixed nozzles 104, the grille 52 may be cleaned more immediately upon detection of debris accumulation.

In one embodiment, the pressurized fluid source 104 may generally comprise a fluid reservoir configured to contain a fluid (e.g., air), particularly a pressurized fluid (e.g., pressurized air). In some embodiments, the fluid reservoir 104 may contain enough pressurized fluid for a certain number of cleaning operations and may thus be configured to be removable from the engine compartment 40 to be refilled or replaced by an operator. However, in other embodiments, the pressurized fluid source 104 may include or may be coupled to a compressor 104A for compressing the fluid contained within the pressurized fluid source 104. In such embodiment, the pressurized fluid source 104 may function to provide pressurized fluid without requiring removal or re-filling of a reservoir. In some embodiments, the compressor 104A may be selectively operated to regulate the supply of pressurized fluid to the nozzles 102. For instance, when it is desired for pressurized fluid to be supplied to the nozzles 102, the compressor 104A may be turned on. Conversely, when pressurized fluid is no longer desired to be supplied to the nozzles 102, the compressor 104A may be turned off. It should be appreciated that while only one fluid reservoir 104 and compressor 104A are shown, any suitable number of fluid reservoirs 104 and compressors 104A may instead be used.

In some embodiments, the system 100 may further include a valve 108 fluidly coupled to the conduit 106 between the nozzles 102 and the pressurized fluid source 104. The valve 108 may be configured to regulate the supply of pressurized fluid from the pressurized fluid source 104 to the nozzles 102. For instance, when the valve 108 is closed (FIG. 4A), the pressurized fluid supplied by the pressurized fluid source 104 is prevented from travelling through the conduit 106 to the nozzles 102. Conversely, when the valve 108 is opened (FIG. 4B), pressurized fluid from the pressurized fluid source 104 may travel through the conduit 106 and the valve 108 for delivery to the nozzles 102. In one embodiment, the valve 108 is configured as a solenoid valve such that the valve 108 may be opened or closed electronically via a controller of the disclosed system. However, it should be appreciated that the valve 108 may be configured as any suitable type of valve, such as a one-way valve, a two-way valve, a manually operated valve, a mechanically operated valve, etc.

It should be appreciated that while the nozzles 102 are shown as being fluidly connected to the pressurized fluid source 104 via the same valve 108 such that all of the nozzles 102 are supplied pressurized fluid when the valve 108 is opened, the nozzles 102 may otherwise be fluidly coupled to the pressurized fluid source 104. For instance, in one embodiment, the system 100 may have two or more valves 108 fluidly connected between the nozzles 102 and the pressurized fluid source 104 such that when at least one of the valves 108 is closed and at least one of the valves 108 is opened, the nozzles 102 associated with the closed valve(s) do not receive pressurized fluid and the nozzles 102 associated with the opened valve(s) receive pressurized fluid. Such selective activation of the nozzles 102 may be used, for example, to allow pressurized fluid to be expelled through specific areas or regions of the grille 52.

Additionally, in some embodiments, the system 100 may further include a pressure sensor 110 configured to generate data indicative of a pressure within the engine compartment 40. For instance, the pressure sensor 110 may be positioned within the engine compartment 40 (e.g., between the grille 52 and at least the heat exchanger 42A of the cooling system 42) such that the pressure sensor 110 can generate data indicative of an air pressure between the grille 52 and the heat exchanger 42A. The pressure sensor 110 may be configured as any suitable pressure sensor configured to measure air pressure. The air pressure detected between the grille 52 and the heat exchanger 42A may be used as an indicator of debris build up on the grille 52 as will be described in greater detail below.

Figure 5:
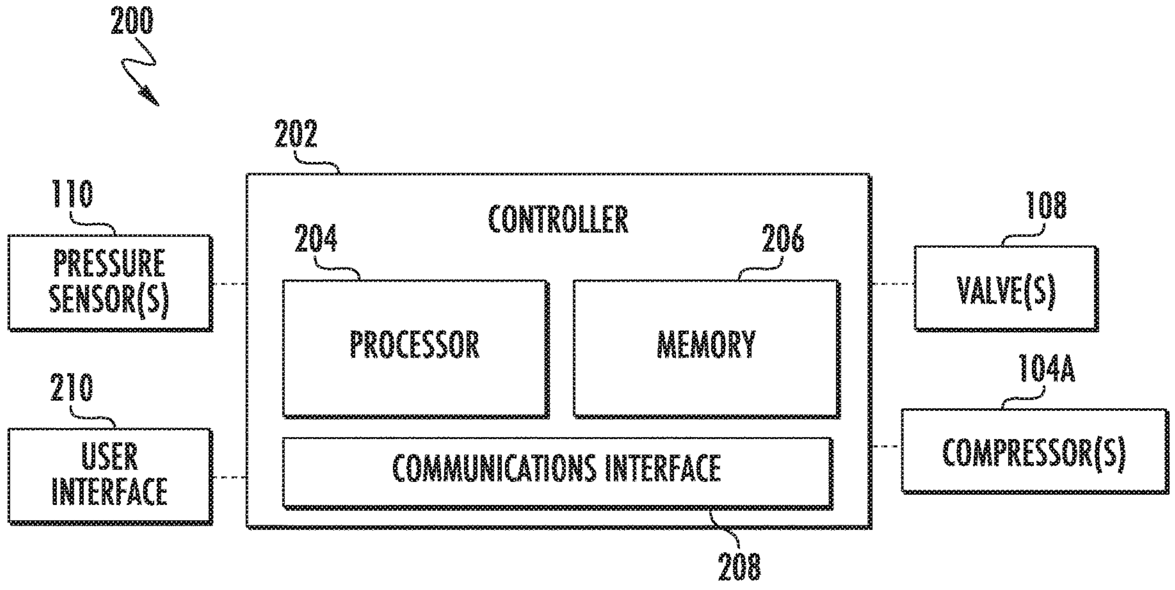
FIG. 5 illustrates a schematic view of one embodiment of a system for cleaning a grille of a work vehicle in accordance with aspects of the present subject matter.

Referring now to FIG. 5, a schematic view of one embodiment of a system 200 for cleaning a grille of a work vehicle is illustrated in accordance with aspects of the present subject matter. In general, the system 200 will be described herein with reference to work vehicle 10 described above with reference to FIGS. 1 and 2, and the system 100 described above with reference to FIGS. 3-4B. However, it should be appreciated by those of ordinary skill in the art that the disclosed system 200 may generally be utilized with work vehicles and systems having any other suitable configuration.

As shown in FIG. 5, the system 200 may include a controller 202 configured to electronically control the operation of one or more components of the work vehicle 10. In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods that will be described herein. In addition, the controller 202 may also include various other suitable components, such as one or more input/output channels, a data/control bus and/or the like.

It should be appreciated that, in several embodiments, the controller 202 may correspond to an existing controller of the work vehicle 10. However, it should be appreciated that, in other embodiments, the controller 202 may instead correspond to a separate processing device. For instance, in one embodiment, the controller 202 may form all or part of a separate plug-in module that may be installed within the work vehicle 10 to allow for the disclosed system and method to be implemented without requiring additional software to be uploaded onto existing control devices of the work vehicle 10.

In some embodiments, the controller 202 may be configured to include a communications module or interface 208 to allow for the controller 202 to communicate with any of the various other system components described herein. For instance, the controller 202 may, in several embodiments, be configured to receive data or sensor inputs from one or more sensors that are used to detect one or more parameters associated with debris accumulation relative to the grille 52 of the vehicle 10. For instance, the controller 202 may be communicatively coupled to one or more pressure sensor(s) 110 via any suitable connection, such as a wired or wireless connection, to allow data associated with cleaning the grille 52 to be transmitted from the sensor(s) 110 to the controller 202. Further, the controller 202 may be communicatively coupled to one or more components of the system 100, such as the compressor 104A and/or the valve 108, to allow the controller 202 to control such components 104A, 108. Additionally, the controller 202 may be communicatively coupled to a user interface 210 to allow the controller 202 to receive inputs from an operator via the user interface 210 and/or control the operation of the user interface 210.

For example, referring back to FIGS. 4A-4B, in some embodiments, an input associated with cleaning the grille 52 may be received from one or more pressure sensors 110 that generate data indicative of an air pressure between the grille 52 and the heat exchanger 42A. Thus, in such embodiments, the controller 202 may be configured to determine the presence of debris accumulation on the grille 52 based at least in part on the data received from the sensor(s) 110. For example, the controller 202 may include one or more suitable algorithms stored within its memory 206 that, when executed by the processor 204, allow the controller 202 to compare the detected air pressure between the grille 52 and the heat exchanger 42A (e.g., the air pressure determined from the data received from the pressure sensor(s) 110) to a pressure threshold(s) to determine whether debris accumulation is present on the grille 52. For instance, pressure threshold(s) may generally correspond to a desired air pressure (or air pressure range) between the grille 52 and the heat exchanger 42A. Thus, the controller 202 may determine that the air pressure between the grille 52 and the heat exchanger 42A is not acceptable when the detected air pressure differs from the pressure threshold(s), such as by exceeding or falling below the relevant threshold(s). Typically, the air pressure between the grille 52 and the heat exchanger 42A increases as the grille 52 accumulates more debris. Thus, the controller 202 may particularly determine that the air pressure between the grille 52 and the heat exchanger 42A is not acceptable when the detected air pressure exceeds the associated pressure threshold (e.g., by a given amount).

In some embodiments, the controller 202 may be configured to determine the severity of the debris accumulation on the grille 52. For instance, in such embodiments, the controller 202 may be configured to compare the air pressure to one or more different pressure thresholds, with each pressure threshold corresponding to the air pressure between the grille 52 and the heat exchanger 42A when a certain amount of debris has accumulated on the grille 52. For example, the pressure thresholds may include a minor pressure threshold corresponding to the pressure between the grille 52 and the heat exchanger 42A at or above which the grille 52 is experiencing minor debris accumulation. Similarly, the pressure thresholds may include a major pressure threshold corresponding to the pressure between the grille 52 and the heat exchanger 42A at or above which the grille 52 is experiencing major debris accumulation, with the major pressure threshold being higher than the minor pressure threshold. Depending on the severity of the debris accumulation (e.g., major or minor), the controller 202 may select different control actions as will be described below.

Alternatively, the controller 202 may be configured to receive an input associated with cleaning the grille 52 from any other suitable source. For instance, in one embodiment, the controller 202 may be configured to receive an input associated with cleaning the grille 52 from an operator of the vehicle 10 via the user interface 210. Further, in some embodiments, the controller 202 may include an electronic cleaning module (not shown) configured to run during operation of the work vehicle 10. The electronic cleaning module may be configured to monitor one or more operating parameters of the vehicle 10, such as the total operating time, the length of time since the last cleaning of the grille 52, the field conditions of the field (e.g., wind speed, soil moisture, etc.) in which the vehicle 10 is operating, a distance traveled, and/or the like, and generate and transmit a message to the controller 202 associated with cleaning the grille 52 when one or more of the operating parameters of the vehicle 10 differ from predetermined values or thresholds. For instance, the controller 202 may receive an input associated with cleaning the grille 52 from the electronic cleaning module when the total operating time of the vehicle 10 exceeds a predetermined operating time, when the length of time since the last cleaning exceeds a predetermined length of time, when the wind speed exceeds a wind speed threshold, when the soil moisture falls below a wind speed threshold, and/or the like. The electronic cleaning module may be configured to transmit the input to the controller 202 on a predetermined interval selected depending on the exceeded operating parameter values or thresholds.

The controller 202 may be configured to initiate a cleaning operation for cleaning the grille 52 based on the receipt of an input associated with cleaning the grille 52. For instance, the controller 202 may be configured to control the operation of the valve(s) 108 and/or the compressor(s) 104A to supply pressurized fluid from the pressurized fluid source 104 to the nozzles 102. As indicated above, the controller 202 may be configured to open the valve(s) 108 upon receipt of the input associated with cleaning the grille 52 to allow the pressurized fluid from the pressurized fluid source 104 to be supplied through the conduit 106 and valve 108 to the nozzles 102. Additionally, or alternatively, the controller 202 may be configured to operate the compressor(s) 104A to supply and/or pressurize the fluid within the pressurized fluid source 104 such that the pressurized fluid is supplied through the conduit 106 to the nozzles 102. In some embodiments, the controller 202 may initiate the cleaning operation depending on the severity of the debris accumulation (e.g., determined using the minor and major thresholds described above). For instance, in some embodiments, the controller 202 may only initiate the cleaning operation if the grille 52 is experiencing a major debris accumulation.

As discussed above, the nozzles 102 may be fixed relative to the grille 52 and configured to direct the pressurized fluid received from the pressurized fluid source 104 towards the grille 52. Thus, when the pressurized fluid is received by the nozzles 102, the nozzles 102 may expel the pressurized fluid through the grille 52 (e.g., from the inner side 52A to the outer side 52B) to remove debris from the grille 52.

In some embodiments, the controller 202 may further be configured to cease the supply of pressurized fluid from the pressurized fluid source 104. For instance, in one embodiment, the controller 202 may include one or more suitable algorithms stored within its memory 206 that, when executed by the processor 204, allow the controller 202 to compare the detected air pressure between the grille 52 and the heat exchanger 42A to the pressure threshold to determine whether debris accumulation is still present on the grille 52. Thus, the controller 202 may continue to compare the detected air pressure between the grille 52 and the heat exchanger 42A and determine that the debris is no longer present when the air pressure between the grille 52 and the heat exchanger 42A is equal to or falls below the pressure threshold. After determining that debris is no longer accumulated on the grille 52, the controller 202 may control the valve(s) 108 to close and/or shut off the compressor(s) 104A to discontinue the supply of pressurized fluid from the pressurized fluid source 104 to the nozzles 102.

Alternatively, in some embodiments, the controller 202 may be configured to cease the supply of pressurized fluid from the pressurized fluid source 104 after a period of time has elapsed from starting the supply of pressurized fluid from the pressurized fluid source 104. In some embodiments, the period of time is selected based at least in part on the severity of the debris accumulation at the initiation of the cleaning operation (e.g., determined using the minor and major thresholds described above). For instance, in some embodiments, when the grille 52 has major debris accumulation detected at the start of the cleaning operation, the period of time may be longer than if only minor debris accumulation was detected at the start of the cleaning operation. Additionally, the controller 202 may be configured to cease the supply of pressurized fluid from the pressurized fluid source 104 upon receiving an input from an operator (e.g., via the user interface 210) indicative of the grille 52 being sufficiently clean.

Moreover, in some embodiments, the controller 202 may be configured to indicate to an operator the presence of debris on the grille 52. For example, the communications module 208 may allow the controller 202 to communicate with the user interface 210 having a display device configured to display information to an operator. In one embodiment, the controller 202 may generate a notification indicating to an operator a presence of debris accumulation on the grille 52. For example, the controller 202 may generate a notification indicating the presence of debris accumulation when debris accumulation is still present after pressurized fluid from the pressurized fluid source 104 has been directed through the grille 52. However, it should be appreciated that the controller 202 may instead be communicatively coupled to any number of other indicators, such as lights, alarms, and/or the like to indicate the debris accumulation to the operator.

Figure 6:
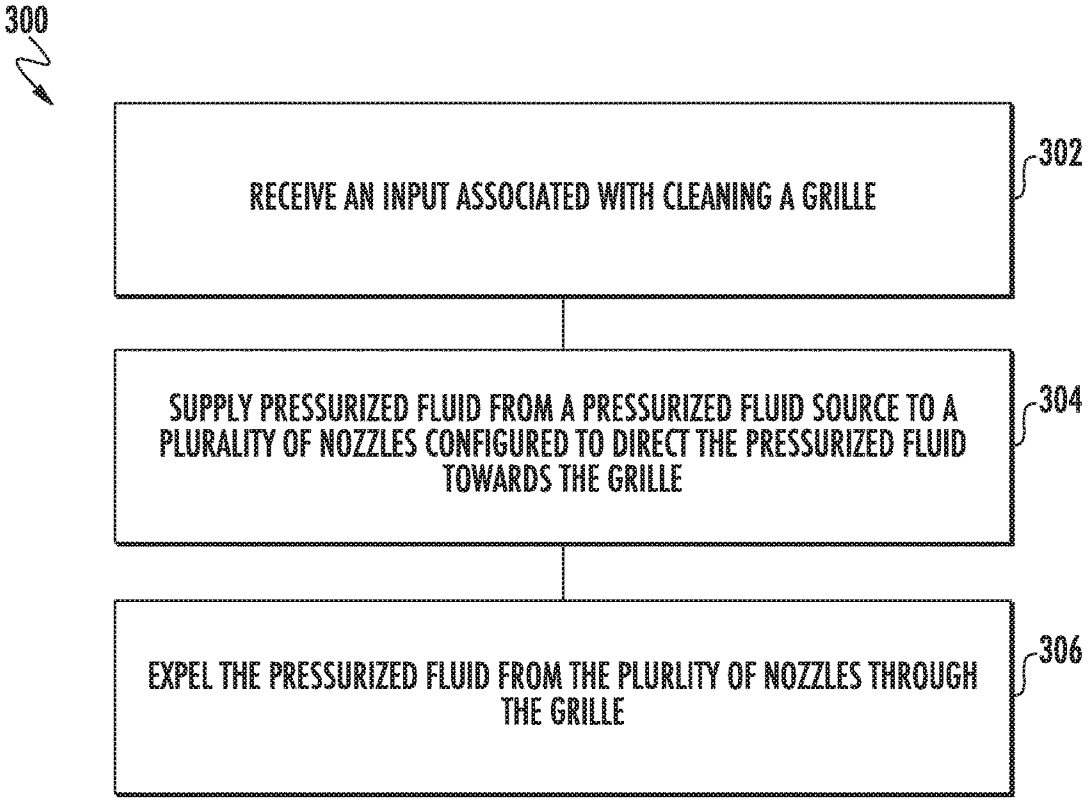
FIG. 6 illustrates a method for cleaning a grille of a work vehicle in accordance with aspects of the present subject matter.

Referring now to FIG. 6, a flow diagram of one embodiment of a method 300 for cleaning a grille of a work vehicle is illustrated in accordance with aspects of the present subject matter. In general, the method 300 will be described herein with reference to the work vehicle 10 shown in FIGS. 1 and 2, as well as the various system components shown in FIGS. 3-5. However, it should be appreciated that the disclosed method 300 may be implemented with work vehicles having any other suitable configurations and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 6, at (302), the method 300 may include receiving an input associated with cleaning the grille. For instance, as indicated above, the sensors 110 may generate data indicative of the pressure between the grille 52 and the cooling system 42. When the pressure between the grille 52 and the cooling system 42 exceeds a pressure threshold(s) associated with excessive debris accumulation on the grille 52, the grille 52 needs to be cleaned. Alternatively, or additionally, an input may be received from the operator of the vehicle 10 and/or an electronic cleaning module indicating that the grille 52 needs to be cleaned.

Further, at (304), the method 300 may include supplying pressurized fluid from a pressurized fluid source to a plurality of nozzles configured to direct the pressurized fluid towards the grille. For instance, as described above, the valve 108 may be opened and/or the compressor 104A may be turned on to allow pressurized fluid to be supplied to the nozzles 102.

Additionally, at (306), the method 300 may include expelling the pressurized fluid from the plurality of nozzles through the grille. The pressurized fluid supplied to the nozzles 102 from the pressurized fluid source 104 is expelled from the nozzles 102 and through the grille 52 from the inner side 52A towards the outer side 52B. When debris is present on the outer side 52B of the grille 52, the debris is removed from the grille 52 as the pressurized fluid flows through the grille 52.

It is to be understood that, in several embodiments, the steps of the method 300 may be performed by the controller 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A work vehicle, the work vehicle comprising:

a chassis;

a plurality of wheels supporting the chassis;

an engine compartment supported on the chassis;

a grille defining an inner side facing towards the engine compartment and an outer side facing towards an exterior of the work vehicle; and a cleaning system comprising:

a plurality of nozzles within the engine compartment and directed towards the inner side of the grille, the plurality of nozzles and the grille being fixed relative to each other;

a pressurized fluid source configured to supply pressurized fluid to the plurality of nozzles, the pressurized fluid received by the plurality of nozzles being expelled from the plurality of nozzles and directed through the grille from the inner side to the outer side;

a valve fluidly coupled between the pressurized fluid source and the plurality of nozzles, the valve being configured to regulate the supply of pressurized fluid from the pressurized fluid source to the plurality of nozzles; and a controller communicatively coupled to the valve, the controller having an electronic cleaning module configured to monitor field conditions, the controller being configured to selectively open and close the valve to regulate the supply of pressurized fluid from the pressurized fluid source to the plurality of nozzles based at least in part on the monitored field conditions.

2. The work vehicle of claim 1, further comprising a heat exchanger within the engine compartment, wherein the cleaning system further comprises a pressure sensor configured to generate pressure data indicative of an air pressure between the grille and the heat exchanger positioned aft of the grille within the engine compartment, and wherein the controller is communicatively coupled to the pressure sensor, the controller being configured to open the valve when the air pressure between the grille and the heat exchanger exceeds a pressure threshold to allow the pressurized fluid from the pressurized fluid source to be supplied to the plurality of nozzles and expelled from the plurality of nozzles towards the grille.

3. The work vehicle of claim 2, wherein the pressure sensor is positioned within the engine compartment of the work vehicle to allow the pressure sensor to detect the air pressure between the grille and the heat exchanger.

4. The work vehicle of claim 1, wherein the controller is communicatively coupled to a user interface, the controller being configured to open the valve upon receipt of an input from the user interface.

5. The work vehicle of claim 1, wherein nozzles of the plurality of nozzles are spaced apart laterally across a width of the grille and vertically across a height of the grille, the plurality of nozzles being directed towards a first face of the grille such that the pressurized fluid received by the plurality of nozzles is expelled from the plurality of nozzles and directed through the first face of the grille.

6. The work vehicle of claim 1, further comprising a heat exchanger within the engine compartment, wherein the plurality of nozzles is positioned between the grille and the heat exchanger.

7. The work vehicle of claim 1, wherein the controller is configured to open the valve when the field conditions differ from a predetermined value or threshold.

8. The work vehicle of claim 1, wherein the electronic cleaning module is further configured to monitor operating conditions, the controller being configured to open the valve when a total operating time of the work vehicle exceeds a predetermined value or threshold or a length of time since a last cleaning of the grille exceeds a predetermined value or threshold.

9. The work vehicle of claim 1, wherein the electronic cleaning module is configured to monitor the field conditions of a field by monitoring one or both of wind speed at the field or soil moisture within the field.

* * * * *